Sept. 15, 1964 T. P. FARKAS 3,149,293

ELECTRONIC TIMER OR PULSE TIME MODULATOR

Filed Oct. 19, 1960

INVENTOR.
THOMAS P. FARKAS

BY Teller & McCormick

ATTORNEYS

United States Patent Office 3,149,293
Patented Sept. 15, 1964

3,149,293
ELECTRONIC TIMER OR PULSE TIME MODULATOR

Thomas P. Farkas, 14 Rundelane, Bloomfield, Conn.
Filed Oct. 19, 1960, Ser. No. 63,672
4 Claims. (Cl. 332—15)

It is the general object of the present invention to provide a small and compact electronic timer which can be utilized to operate a relay and for other purposes and which provides a series of discrete pulses rising at equal intervals of time and which vary in duration in keeping with an independent variable such as a temperature condition.

The drawing shows a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

Figure 1:
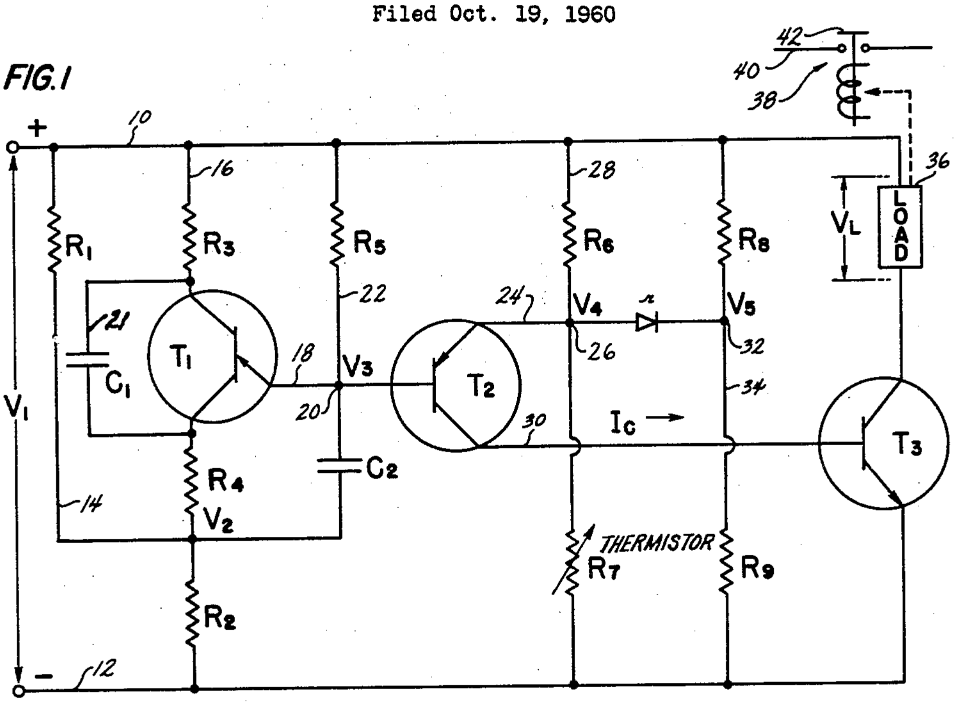
FIG. 1 is a schematic wiring diagram of a timer embodying the invention.

A first part of the timer of the present invention comprises a repeating wave generator and, in the presently preferred form, a low frequency ramp or saw-tooth generator of a conventional type utilizing a unijunction transistor is provided. First and second lead conductors 10 and 12 connected with a direct current power supply not shown have a first resistance bridge connected thereacross, the said bridge comprising a first connecting conductor 14 and resistors $R_1$ and $R_2$. A second resistance bridge comprising a second connecting conductor 16 and resistors $R_3$ and $R_4$ is connected from the first lead conductor 10 to the first connecting conductor 14 as shown to establish the low limit of the saw-tooth wave. Unijunction transistor $T_1$ is connected in said second resistance bridge through its base terminals and a capacitor $C_1$ connected in a conductor 21 in parallel with the unijunction transistor $T_1$ renders the transistor insensitive to stray pickup such as radio noise. A first signal conductor 18 is connected to the emitter terminal thereof and to a first junction 20, said junction being located in a third connecting conductor 22 between a resistor $R_5$ and a capacitor $C_2$ which together form a resistance-capacitance network in parallel with the said second resistance bridge.

Figures 2, 4, 6:
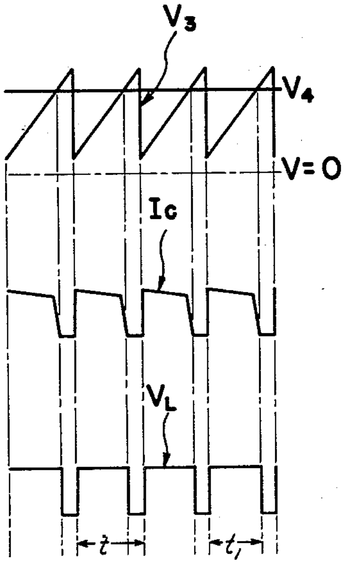
FIG. 2 illustrates a saw-tooth wave $V_3$ and a superimposed bias voltage $V_4$.
FIG. 4 illustrates a series of pulses derived from FIG. 2.
FIG. 6 illustrates a square wave derived from the pulses of FIG. 4.
Figures 3, 5, 7:
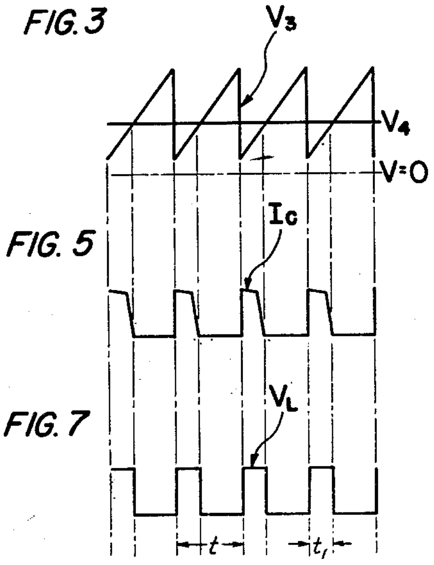
FIG. 3 illustrates a saw-tooth wave $V_3$ and a superimposed bias voltage $V_4$ of another magnitude.
FIG. 5 illustrates a series of pulses derived from FIG. 3.
FIG. 7 illustrates a square wave derived from the pulses of FIG. 5.

It will be apparent that the saw-tooth generator shown and described has been substantially simplified with the omission of transistor compensating means and that no means for adjusting the saw tooth has been shown. Such means are to be understood to be within the scope of the invention. FIGS. 2 and 3 depict a saw-tooth wave $V_3$ as will appear at the aforesaid first junction 20, it being noted that the low limit of the wave is somewhat above ground.

A second part of the timer of the invention comprises a means connected in circuit with the aforesaid saw-tooth generator and operable to provide a series of discrete electrical pulses which rise at equal intervals of time and each of which has a duration proportional to an independent variable. More specifically, said means comprises an electron valve conductive and nonconductive respectively with the application of an electrical potential in one and an opposite direction. The wave from the saw-tooth generator is applied to the valve together with a signal voltage of a magnitude proportional to the independent variable and conduction occurs under the joint control of the said wave and voltage to provide pulses of the type mentioned. Other devices may be used alternatively, but in accordance with the presently preferred practice, a PNP transistor $T_2$ is provided and the base terminal thereof is connected with the previously mentioned first signal conductor 18. The emitter terminal of the transistor $T_2$ is connected with the lead conductor 10 through a bias conductor 24, a second junction 26, a portion of a fourth connecting conductor 28, and a resistor $R_6$ whereby to provide a positive substantially linear direct current bias voltage $V_4$ for the emitter.

In accordance with the invention, there is also provided an electrical signal generator which is operable responsive to an independent variable and which provides an electrical signal proportional to the variable. Obviously, a wide variety of signal generators may be utilized but in the preferred embodiment of the invention shown a temperature-voltage transducer is provided, i.e., the bias voltage $V_4$ is varied in accordance with a temperature condition. A thermistor $R_7$ connected in the conductor 28 between the said second junction 26 and the lead conductor 12 varies in resistance inversely with temperature. Thus, it will be seen that the emitter bias voltage $V_4$ will vary inversely with temperature. FIG. 2 illustrates the relationship of the bias voltage $V_4$ to the saw-tooth wave $V_3$ for a comparatively low temperature condition and in FIG. 3 a similar relationship is shown for a comparatively high temperature condition.

Since the transistor $T_2$ will conduct only when the emitter bias voltage $V_4$ is more positive than the base voltage $V_3$ current $I_c$ will flow only intermittently in a second signal conductor 30 connected with the collector terminal of the transistor. Such current flow $I_c$ takes the form of discrete generally square pulses rising at equal intervals of time as illustrated in FIGS. 4 and 5 and, as is further illustrated in said two figures, the duration of each pulse is proportional to the magnitude of the bias voltage $V_4$ and thus is proportional to the independent variable. Specifically, in the embodiment of the invention shown, the duration of the pulses varies inversely with the temperature felt by the thermistor $R_7$.

While compensating means for the transistor $T_2$ and means for adjusting the bias voltage $V_4$ are neither shown nor described, it will be understood that such conventional means are within the scope of the invention. A limiting means for the bias voltage is shown, however, and said means is provided in accordance with another aspect of the present invention. Said limiting means comprises a rectifier $r$ connected in the bias conductor 24 and operable to limit the bias voltage $V_4$ to a magnitude equal to that of a limiting voltage $V_5$. The said limiting voltage appears at a third junction 32 in a third resistance bridge comprising a fifth connecting conductor 34 between the lead conductors 10 and 12 and resistors $R_8$ and $R_9$. The magnitude of the limiting voltage $V_5$ is less than the peak voltage of the saw-tooth wave $V_3$ so that conduction cannot occur continuously at the transistor $T_2$ preventing the formation of the desired discrete pulses.

A final portion of the timer of the present invention comprises an amplifying means which may take a wide variety of forms but which preferably comprises a third transistor $T_3$ of NPN type. As shown, the transistor $T_3$ has its base terminal connected with the collector terminal of the aforementioned transistor $T_2$ by connection with the second signal conductor 30. The collector terminal of the transistor $T_3$ is connected with the lead conductor 10 and a load 36 therein and the emitter terminal thereof is connected with the lead conductor 12. The load 36 may of course take a variety of forms and an illustrated load comprising a relay 38 in a power line 40 is merely exemplary.

It will be apparent that the transistor $T_3$ will serve to amplify the discrete pulses such as are shown in FIGS. 4 and 5 and; it will be further apparent that, if properly selected for saturation, the said transistor will serve to provide a usable potential $V_L$ across the load 36 substantially in the form of a square wave. The duration of each portion of the wave however, as illustrated in FIGS. 6 and 7, will be proportional to the independent variable as in the case of the discrete pulses supplied to the transistor. In the case of the relay 38 shown, a switch arm 42 thereof will be closed at equal intervals of time $t$ but will remain closed for periods of time $t_1$ proportional to the temperature felt by the thermistor $R_7$.

The invention claimed is:

1. In a temperature responsive electronic timer, the combination of:
   a low and substantially constant frequency saw-tooth generator,
   a signal generator including a temperature sensitive means and which is operable to provide a substantially linear direct current signal voltage proportional to a sensed temperature,
   a three terminal transistor having a first terminal connected in circuit with said saw-tooth generator and a second terminal connected in circuit with said signal generator so as to provide an output signal at its third terminal in the form of a series of discrete pulses rising at equal intervals of time and each of a duration proportional to said signal voltage,
   means including a rectifier and resistance bridge connected in circuit with said signal generator and said second transistor terminal to impose a maximum limit on said signal voltage and to thereby limit the duration of said pulses, and
   an amplifier comprising at least one transistor connected in circuit with said third transistor terminal and with a load.

2. In a temperature responsive electronic timer the combination of:
   a pair of lead conductors connected with a direct current power supply,
   circuit means connected with said lead conductors and operable to provide a potential in saw-tooth form at a first junction,
   a first transistor with its base terminal connected with said first junction and with its emitter terminal connected with one of said lead conductors through a second junction and a resistor so as to provide a direct current emitter bias voltage,
   an element which varies in resistance in accordance with a sensed temperature connected between said second junction and the other of said lead conductors so as to provide for variation in said emitter bias voltage in keeping with the sensed temperature,
   a resistance bridge connected across said lead conductors, a rectifier connected between said second junction and said resistance bridge so as to limit the magnitude of said bias voltage, and
   a second transistor connected with a load and with said first transistor, said first transistor providing a series of discrete pulses rising at equal intervals of time and of a duration proportional to the sensed temperature and said second transistor serving to amplify and to square said pulses.

3. In a temperature responsive electronic timer, the combination of:
   a low and substantially constant frequency saw-tooth generator,
   a signal generator including a temperature sensitive means and which is operable to provide a substantially linear direct current signal voltage proportional to a sensed temperature,
   a three terminal transistor having a first terminal connected in circuit with said saw-tooth generator and a second terminal connected in circuit with said signal generator so as to provide an output signal at its third terminal in the form of a series of discrete pulses rising at equal intervals of time and each of a duration proportional to said signal voltage, and
   an amplifier comprising at least one transistor connected in circuit with said third transistor terminal and with a load.

4. In a temperature responsive electronic timer, the combination of:
   a low and substantially constant frequency saw-tooth generator,
   a signal generator including a temperature sensitive means and which is operable to provide a substantially linear direct current signal voltage proportional to a sensed temperature,
   a three terminal transistor having a first terminal connected in circuit with said saw-tooth generator and a second terminal connected in circuit with said signal generator so as to provide an output signal at its third terminal in the form of a series of discrete pulses rising at equal intervals of time and each of a duration proportional to said signal voltage,
   means connected in circuit with said signal generator and with said second transistor terminal to impose a limit on said signal voltage and to thereby limit the duration of said pulses, and
   an amplifier comprising at least one transistor connected in circuit with said third transistor terminal and with a load.

References Cited in the file of this patent

UNITED STATES PATENTS

| | | |
|---|---|---|
| 2,760,159 | Brown et al. | Aug. 21, 1956 |
| 2,889,496 | Moore | June 2, 1959 |
| 2,992,120 | Elsken | July 11, 1961 |

OTHER REFERENCES

Herzog: Electronics, "Transistors Simplify Control of Target Drone," pages 52–54, May 1, 1959.

TM–11 690, Department of the Army Technical Manual, pages 90–94, March 1959.